(No Model.)
M. GARLAND.
ROPE OR CABLE COUPLING.
No. 366,473. Patented July 12, 1887.
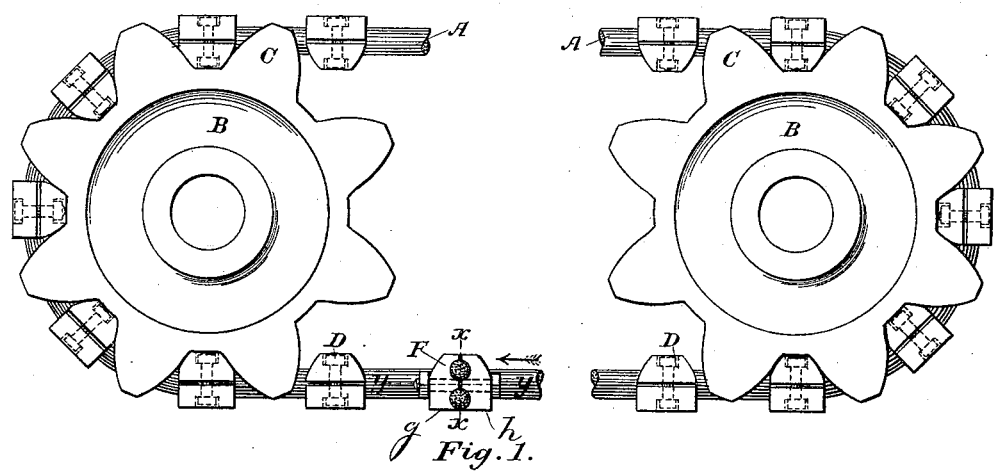
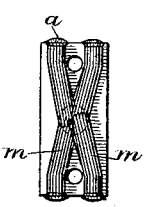
Fig. 3.
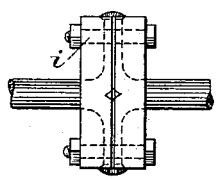
Fig. 2.
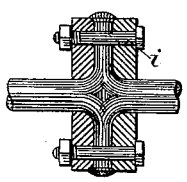
Fig. 4.
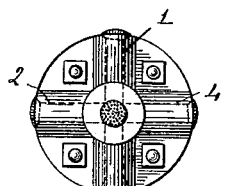
Fig. 6.
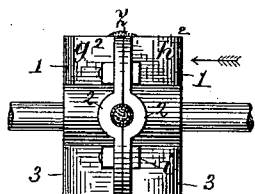
Fig. 5.
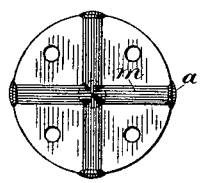
Fig. 7.
Witnesses:
W. J. Graham.
H. Hansen.
Inventor:
M. Garland.
By J. N. McIntire.
Attorney.

UNITED STATES PATENT OFFICE.

MICHAEL GARLAND, OF BAY CITY, MICHIGAN.

ROPE OR CABLE COUPLING.

SPECIFICATION forming part of Letters Patent No. 366,473, dated July 12, 1887.

Application filed March 14, 1887. Serial No. 230,898. (No model.)

*To all whom it may concern:*

Be it known that I, MICHAEL GARLAND, of Bay City, in the county of Bay and State of Michigan, have invented a new and useful Improved Rope or Cable Coupling or Splice Device; and I do hereby declare that the following is a full, clear, and exact description thereof, reference being had to the accompanying drawings, making part of this application.

My invention relates to means for coupling together or splicing rope or cable ends.

Heretofore various means have been employed for the purpose mentioned, which arises most frequently in the formation of endless bands of wire or other ropes in hoisting and conveying machines, and in the use of cables in connection with rope wheels or pulleys for the purposes of transmission of power and motion; but in no prior instance that I know of has a rope or cable coupler contrivance or splice been made involving the principle of construction and mode of action peculiar to my novel device.

My improved contrivance, which will be hereinafter more fully explained, and which will be particularly described and most clearly defined in the claims of this specification, is designed more especially for use in connection with a rope or cable for transmitting power and motion, and also for carrier and conveyer purposes, designed by me and made the subject of a separate application for Letters Patent; but it may be used in other connections without the loss of its main advantages.

To enable those skilled in the art to which my invention relates to understand and practice it, I will now proceed to more fully explain my improvement, referring by letters to the accompanying drawings, which form part of this specification, and in which I have shown my invention carried out in those forms in which I have so far practiced it, and which are about the best now known to me.

In the drawings, Figure 1 is an elevation of a pair of rope-wheels banded together with a cable provided with one of my novel coupler devices. Fig. 2 is a partial top view of the cable, showing in plan the novel coupler device. Fig. 3 is a detail vertical section at $xx$, Fig. 1, looking in the direction indicated by the arrow. Fig. 4 is a detail horizontal section of the coupler at the line $yy$, Fig. 1. Fig. 5 shows in elevation a modification of the coupler device. Fig. 6 is an end view of said modification viewed in the direction indicated by the arrow at Fig. 5. Fig. 7 is a vertical section of the same at line $zz$, Fig. 5, looking in the same direction.

In the several figures the same parts are designated by the same letters of reference.

In Fig. 1, where I have shown my invention applied to an endless wire cable for transmitting power and motion, A is the rope or cable, and B B two rope-wheels of peculiar structure, over the grooved peripheries of which passes the cable A, and with the toothed flanges C of which wheels engage certain interlocking devices, D, in a manner such that the said cable and engaging wheels constitute a means for positively transmitting power and motion. In this figure is seen at F in end elevation the coupler device made the subject of this application. It is composed, as seen in this and other figures, of two parts, $g$ and $h$, which are secured together by screws or screw-bolts $i$ in such manner as to embrace the cable or rope A between them and securely clamp its bifurcated ends in a peculiar manner, which I will now describe by reference to the figures, showing more particularly the construction and arrangement together of the clamping devices and the clamped cable ends.

Each of the parts $g$ $h$ is centrally perforated, as shown, with a hole of about the same size, circumferentially, as the cable A, and each of said parts is provided, as shown, with grooves $m$, which are formed in that surface or face of each part that is adjacent to the other when the two parts are clamped together. Each of said grooves $m$ is of the proper shape and capacity in cross-section to accommodate a strand (of the disintegrated cable end) equal in thickness to about one-fourth the thickness or cross-sectional bulk of the entire cable A, and the said grooves follow such courses lengthwise (in the adjacent faces of the parts $g$ and $h$) that they diverge sufficiently near their extremities to clear or to permit the free passage between them of the bolts $i$, by means of which the parts are clamped together. Preferably the ends of these grooves in each part are slightly countersunk, so as to permit the upsetting within said countersunk portions or the riveting therein of the end portions, $a$, of the split cable strands or parts, as clearly shown.

Now, it will be seen that by first slipping onto each of the cable ends one of the perforated parts $g$ $h$, (placing the two in the proper relative position,) and then splitting each end of the rope A (to be spliced or coupled) into four parts or strands, as shown, to a distance sufficient to make the disintegrated parts of each rope end long enough to fill the grooves $m$ of each part $g$ and $h$ lengthwise, and also afford slightly protruding ends, and then spreading apart the split end in pairs of strands in opposite directions to fill the grooves $m$ of the two parts $g$ $h$, and finally bringing together and securely fastening said parts by means of the bolts $i$, the split and spread-apart portions of the rope ends will be securely held in a line transverse to the length or draft-line of the cable between the parts $g$ $h$, all as fully illustrated in the drawings. And it will be understood that in a union thus effected the coupled disintegrated ends of the cable will be inseparably united, while at the same time, by merely unclamping its bifurcated end portions, (by loosening the bolts $i$ and sliding apart the pieces $g$ $h$,) the splice or union may be completely destroyed, temporarily, for shortening the endless band, or for any other purpose desired.

One great advantage in the use of my novel coupler device lies in its adaptability for use in the double capacity of a coupler and a sprocket-wheel-engaging device, such as necessary in the use of a power and motion transmitter such as shown at Fig. 1, and made (as hereinbefore remarked) the subject-matter of another application for Letters Patent by me. In all the figures except Figs. 5, 6, and 7 I have shown the coupler designed or shaped to fulfill these two functions, while at Figs. 5, 6, and 7 I have shown a modification in which the two parts $g^2$ $h^2$ of the coupler are circular in a sectional view taken transversely to the rope, and said coupler being designed to perform also the function of a carrier-flight in a conveyer-machine.

In the form of coupler shown at Figs. 5, 6, and 7 the rope ends are each split into four parts, that are laid in the four radially-arranged grooves of the circular parts $g^2$ $h^2$, which latter, as shown, are formed with swells 1 2 3 4 to give the requisite strength, and are provided with four of the securing-bolts $i$. In the form shown at Fig. 1 the parts $g$ and $h$ are made so long that the securing-bolts $i$ may be placed, as shown, beyond the localities at which these parts engage with the toothed flanges of the rope-wheels, whereby said bolts need not have either their heads or their nuts countersunk or let in in order to get them out of the way of the sprockets of said wheel-flanges.

Of course my invention may be used in connection with ropes or cables of various materials, and where circumstances render it expedient the gripping-surfaces of the clamping parts may be lined or faced with any suitable material necessary for increasing the grip or frictional hold of the parts $g$ $h$ on the material of the cable.

I wish it to be understood that my invention is not restricted to any precise forms or proportions of parts, as these conditions may be varied without changing the principle of operation of the novel contrivance devised by me, nor to the splitting of rope ends into four strands or parts each, as shown, as a greater or less number may be used; and in lieu of the precise relative arrangement of the disintegrated parts of the rope end and the corresponding number and location shown of the grooves $m$, the latter may be arranged to radiate from the axial line of the cable, especially where a coupler of circular contour (such as seen at Fig. 6) be used.

What I claim as of my invention, and desire to secure by Letters Patent, is—

1. In combination with the suitably divided or split end portions of the rope or cable, clamping bars or plates which have clamping-surfaces arranged transversely to the direction of length of the rope or cable and operating to grip the divided end portions of the latter, all substantially as set forth.

2. In combination with a rope or cable, a clamping device for splicing or connecting the ends thereof, formed or provided, as described, with projecting sprocket-like portions located at each side of the rope or cable and arranged to engage with the toothed flanges of any rope-wheel over which said cable may be run, for the purposes set forth.

In witness whereof I have hereunto set my hand this 24th day of February, 1887.

MICHAEL GARLAND.

In presence of—
W. J. McCORMICK,
C. E. ESTABROOKS.